(12) United States Patent
Stanich et al.

(10) Patent No.: US 11,922,241 B1
(45) Date of Patent: Mar. 5, 2024

(54) PRINTER CALIBRATION MECHANISM

(71) Applicants: Mikel Stanich, Boulder, CO (US);
Walter F. Kailey, Boulder, CO (US);
Scott R. Johnson, Boulder, CO (US);
Pallavi Premkumar, Boulder, CO (US);
William Manchester, Boulder, CO (US)

(72) Inventors: Mikel Stanich, Boulder, CO (US);
Walter F. Kailey, Boulder, CO (US);
Scott R. Johnson, Boulder, CO (US);
Pallavi Premkumar, Boulder, CO (US);
William Manchester, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/182,932

(22) Filed: Mar. 13, 2023

(51) Int. Cl.
*G06K 15/02* (2006.01)
*B41J 2/045* (2006.01)

(52) U.S. Cl.
CPC ........ *G06K 15/027* (2013.01); *B41J 2/04508* (2013.01); *B41J 2/0456* (2013.01); *B41J 2/04586* (2013.01)

(58) Field of Classification Search
CPC .. H04N 1/6033; H04N 1/4015; H04N 1/6041; H04N 1/6097; H04N 1/00034;
(Continued)

(56) References Cited

U.S. PATENT DOCUMENTS 4,436,439 A * 3/1984 Koto ............... B41J 2/19 347/108
6,154,227 A * 11/2000 Lund ............... B41J 2/2054 347/14

(Continued)

FOREIGN PATENT DOCUMENTS

JP 4492789 B2 6/2010
JP 4604733 B2 1/2011
(Continued)

OTHER PUBLICATIONS

Study on Modulation Transfer Function and Optical Characteristics of Printing Paper, downloaded from https://ieeexplore.ieee.org/document/4723285, published Dec. 22, 2008, 3 pages.

*Primary Examiner* — Negussie Worku
(74) *Attorney, Agent, or Firm* — Jaffery Watson Mendonsa & Hamilton LLP

(57) ABSTRACT

A printing system is disclosed. The printing system includes at least one physical memory device to store calibration logic and one or more processors coupled with the at least one physical memory device to execute the calibration logic to receive a reference halftone design, receive reference ink drop size data, receive a reference printer transfer function corresponding to the reference halftone design, a reference printer response target and a reference print substrate, receive first print measurement data corresponding to the reference halftone design, the reference printer transfer function and a first print substrate, receive first printer response target, generate a first intermediate print substrate (Continued)

transfer function based on the first print measurement data and the first printer response target, generate a first printer transfer function based on the first intermediate print substrate transfer function, the reference halftone design, the reference ink drop size data and the reference printer transfer function and generate a first print substrate transfer function as an approximation of a function with input values determined as the first printer transfer function evaluated at digital count values and output values determined as the composition of the first intermediate print substrate transfer function and the reference printer transfer function evaluated at the digital count values, wherein a transfer function comprises a mapping of an input digital count to an output digital count.

20 Claims, 16 Drawing Sheets

(58) Field of Classification Search
CPC ........... H04N 1/00045; H04N 1/32309; H04N 1/405; H04N 1/4057; H04N 1/4078; H04N 1/54; H04N 1/6027; H04N 1/603; H04N 1/6038; H04N 1/605; G06K 15/027; G06K 15/102; G06K 15/129; G06K 15/1878; G06K 15/1881; B41J 2/2132; B41J 2/2146; B41J 2/2052; B41J 2029/3935; B41J 29/393; B41J 2/04508; B41J 2/0456; B41J 2/04586; G03G 15/5025; G03G 15/5058; G06F 3/1206; G06F 3/1208; G06F 3/1219; G06F 3/1229; G06F 3/1257; G06F 3/1282
USPC .......................................................... 358/296
See application file for complete search history.

(56) References Cited

U.S. PATENT DOCUMENTS

| | | | |
|---|---|---|---|
| 6,290,321 B1 * | 9/2001 | Murray | B41J 2/17546 347/7 |
| 6,641,053 B1 * | 11/2003 | Breidenbach | H04N 1/32144 235/494 |
| 7,110,144 B2 | 9/2006 | Cheng et al. | |
| 7,286,266 B2 | 10/2007 | Fujita | |
| 7,835,043 B2 | 11/2010 | Gila | |
| 7,980,650 B2 | 7/2011 | Zhang | |
| 7,986,435 B2 | 7/2011 | Shimbaru | |
| 7,986,447 B2 | 7/2011 | Bang et al. | |
| 8,049,939 B2 | 11/2011 | Wilms et al. | |
| 8,254,000 B2 | 8/2012 | Roscoe | |
| 8,305,644 B2 | 11/2012 | Nakamura | |
| 8,322,811 B2 | 12/2012 | Chandu et al. | |
| 8,454,116 B2 * | 6/2013 | Asauchi | B41J 2/17526 439/534 |
| 8,511,776 B2 | 8/2013 | Tuttnauer | |
| 8,953,219 B2 | 2/2015 | Hallam | |
| 9,056,486 B1 | 6/2015 | Bansyo | |
| 9,070,076 B1 * | 6/2015 | Smith | H04N 1/6058 |
| 9,383,706 B2 | 7/2016 | Tamura | |
| 9,641,726 B1 * | 5/2017 | Schweid | H04N 1/6008 |
| 9,684,272 B2 | 6/2017 | Saito | |
| 10,015,368 B2 | 7/2018 | Kishi | |
| 10,038,824 B1 * | 7/2018 | Das | H04N 1/00244 |
| 10,150,301 B2 | 12/2018 | Inagawa | |
| 10,277,775 B2 | 4/2019 | Kirchhoff | |
| 10,379,790 B2 | 8/2019 | Amit | |
| 10,538,104 B2 | 1/2020 | Mayer | |
| 10,596,808 B2 | 3/2020 | Trachanas | |
| 11,155,077 B2 | 10/2021 | Kollata | |
| 11,155,099 B2 | 10/2021 | Stanich | |
| 11,216,710 B1 | 1/2022 | Stanich et al. | |
| 11,283,936 B1 * | 3/2022 | Stanich | B41J 2/17566 |
| 11,338,591 B1 | 5/2022 | Kailey | |
| 11,351,802 B2 | 6/2022 | Wang | |
| 11,368,592 B1 * | 6/2022 | Kailey | G06K 15/102 |
| 11,415,462 B2 | 8/2022 | Morovic | |
| 11,443,152 B1 | 9/2022 | Stanich et al. | |
| 11,481,162 B1 | 10/2022 | Rao et al. | |
| 11,632,487 B1 * | 4/2023 | Terrab | H04N 1/00034 358/1.9 |
| 2005/0122361 A1 * | 6/2005 | Huang | H04N 1/40087 347/19 |
| 2012/0300232 A1 * | 11/2012 | Kouguchi | H04N 1/6022 358/1.9 |
| 2014/0316841 A1 * | 10/2014 | Kilby | G06F 8/38 705/7.26 |
| 2015/0298153 A1 * | 10/2015 | Baker | H10K 71/00 118/712 |
| 2015/0373305 A1 * | 12/2015 | Hauf | B41J 2/195 118/712 |
| 2022/0294932 A1 | 9/2022 | Morales | |
| 2023/0012070 A1 | 8/2023 | Ogasahara | |
| 2023/0012395 A1 | 12/2023 | Wakana | |

FOREIGN PATENT DOCUMENTS

| | | |
|---|---|---|
| JP | 4844594 B2 | 12/2011 |
| JP | 5043513 B2 | 10/2012 |
| JP | 5391930 B2 | 1/2014 |
| JP | 5409250 B2 | 2/2014 |
| JP | 5743528 B2 | 7/2015 |
| JP | 6040763 B2 | 12/2016 |
| JP | 6123865 A | 5/2017 |
| JP | 6178708 B2 | 8/2017 |
| JP | 6282145 B2 | 2/2018 |
| JP | 6311888 B2 | 4/2018 |
| JP | 6365669 A | 8/2018 |
| JP | 6410978 B1 | 11/2018 |
| JP | 6566052 B2 | 8/2019 |
| JP | 6569869 B2 | 9/2019 |
| JP | 6688627 B2 | 4/2020 |
| JP | 6729091 B2 | 7/2020 |
| JP | 6827307 B2 | 2/2021 |
| JP | 2021086049 A | 6/2021 |
| JP | 6985017 B2 | 11/2021 |
| JP | 2022014744 A | 1/2022 |
| JP | 7050532 B2 | 4/2022 |
| JP | 2022102896 A | 7/2022 |
| JP | 2022136042 A | 9/2022 |
| JP | 7151212 B2 | 10/2022 |
| JP | 7211648 B2 | 1/2023 |
| JP | 2023009770 A | 1/2023 |
| JP | 2023009932 A | 1/2023 |
| JP | 7049715 B1 | 2/2023 |
| JP | 2023052181 A | 4/2023 |
| WO | 2012027100 A1 | 3/2012 |

* cited by examiner

PRINTER CALIBRATION MECHANISM

FIELD OF THE INVENTION

The invention relates to the field of image reproduction, and in particular, to printer calibration.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead contains many nozzles (e.g., inkjet nozzles) for the ejection of ink or any colorant suitable for printing on a medium.

SUMMARY

In one embodiment, a printing system is disclosed. The printing system includes at least one physical memory device to store calibration logic and one or more processors coupled with the at least one physical memory device to execute the calibration logic to receive a reference halftone design, receive reference ink drop size data, receive a reference printer transfer function corresponding to the reference halftone design, a reference printer response target and a reference print substrate, receive first print measurement data corresponding to the reference halftone design, the reference printer transfer function and a first print substrate, receive first printer response target, generate a first intermediate print substrate transfer function based on the first print measurement data and the first printer response target, generate a first printer transfer function based on the first intermediate print substrate transfer function, the reference halftone design, the reference ink drop size data and the reference printer transfer function and generate a first print substrate transfer function as an approximation of a function with input values determined as the first printer transfer function evaluated at digital count values and output values determined as the composition of the first intermediate print substrate transfer function and the reference printer transfer function evaluated at the digital count values, wherein a transfer function comprises a mapping of an input digital count to an output digital count.

BRIEF DESCRIPTION OF THE DRAWINGS

A better understanding of the present invention can be obtained from the following detailed description in conjunction with the following drawings, in which.

DETAILED DESCRIPTION

Optical Density (OD) of production printers changes over time as components experience wear. For example OD increases in an ink jet printer as drop sizes increase due to the wear of printhead components. This change in performance is undesirable because it impacts the consistency of color management. One approach to maintain consistency is to recalibrate primary colors to a specific target OD using a customer's paper. Alternatively, color management profiles (e.g. ICC profiles) may be regenerated to maintain color consistency.

Another approach to restoring baseline printer performance uses recalibration using a standard reference paper. This approach requires constantly recalibrating a printer, which wastes paper, ink and time. Moreover, employing the reference paper recalibration approach requires reinstalling the reference paper to perform the recalibration. This is problematic, since it wastes valuable paper that is reserved for printer setup and requires additional time to change the paper.

According to one embodiment, a printer calibration mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
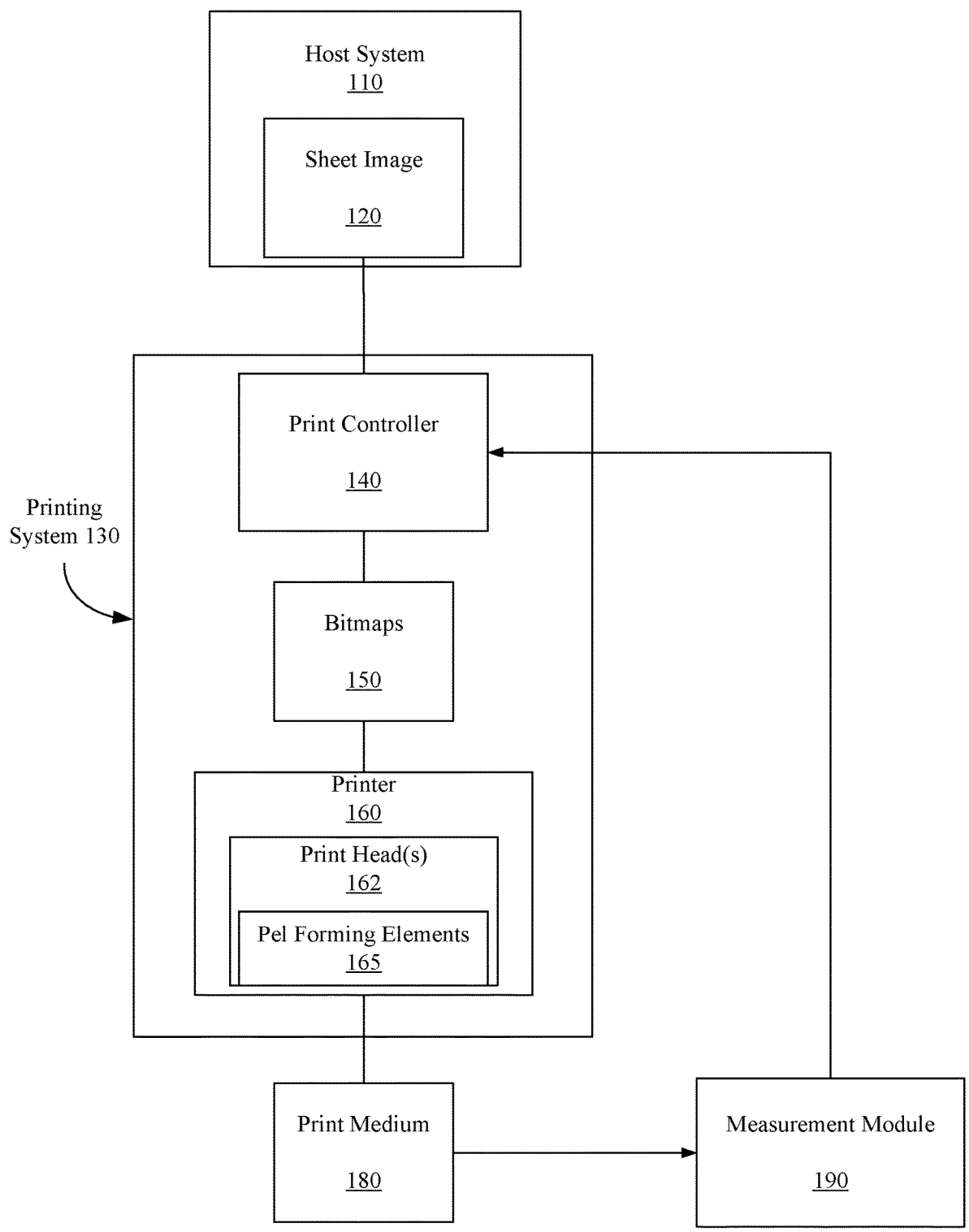
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium (e.g., substrate) suitable for printing. The format of print medium 180 may be continuous form or cut sheet or any other format suitable for printing. Printer 160 may be an ink jet, electrophotographic or another suitable printer type.

In one embodiment, printer 160 comprises one or more printheads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. The pel forming elements 165 may be assigned to one of one or more color planes that correspond to types of marking materials (e.g., Cyan, Magenta, Yellow, and Black (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head 162) or separate physical structures. The resulting print medium 180 may be printed in color and/or in any of a number of gray shades, including black and white (e.g., Cyan, Magenta, Yellow, and Black, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 includes the instructions (e.g., instructed ink drop size and/or instructed pel forming element location) for the one or more printheads 162 and pel forming elements 165. Bitmap 150 may be a halftoned bitmap (e.g., a compensated halftone bit map generated from compensated halftones, or uncompensated halftone bit map generated from uncompensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a compensation system to obtain measurements of the printed medium 180. The measured results are communicated to print controller 140 to be used in a compensation process. The measurement system may be a stand-alone process or be integrated into the printing system 130.

According to one embodiment, measurement module 190 may be a sensor to take measurements of printed images on print medium 180. Measurement module 190 may generate and transmit measurement data. Measurement data may be OD (e.g., optical density), perceptual lightness (e.g., L* in the CIELAB color plane L*a*b*) and/or scanned image (e.g., RGB) data corresponding to a printed image. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer.

Figure 2A:
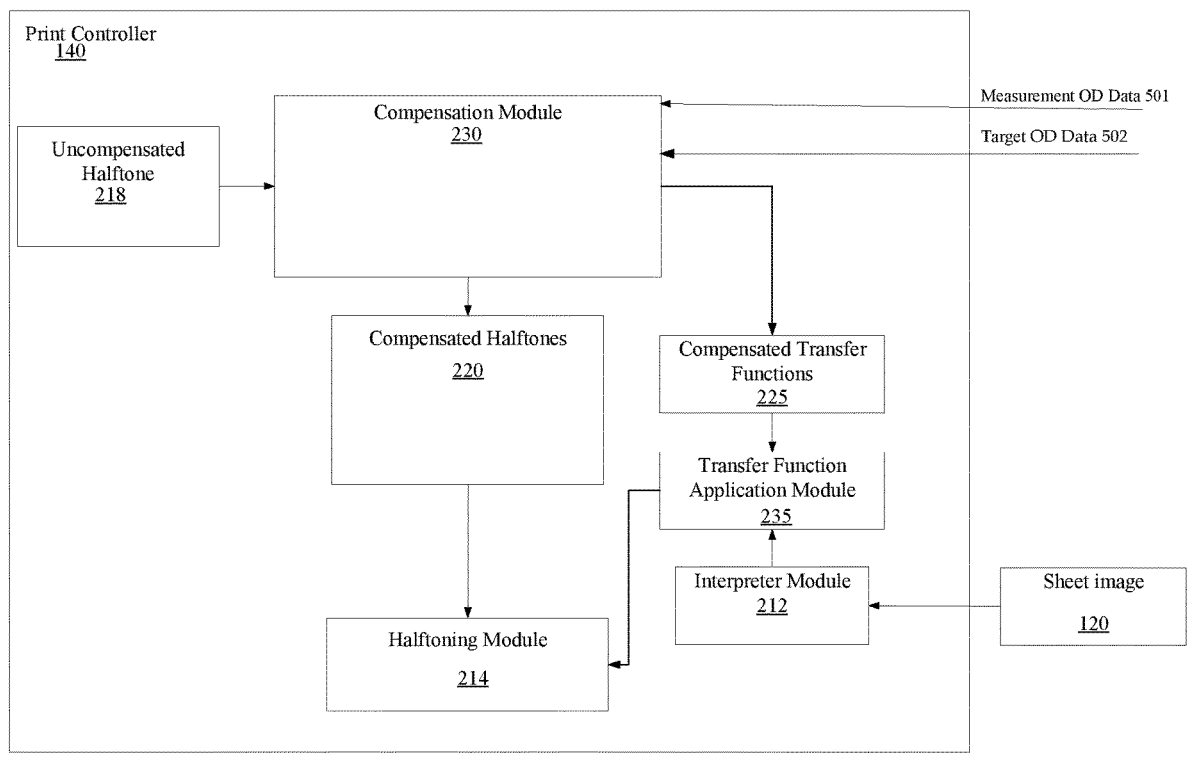
FIGS. 2A&2B are block diagrams illustrating embodiment of a print controller.
Figure 2B:
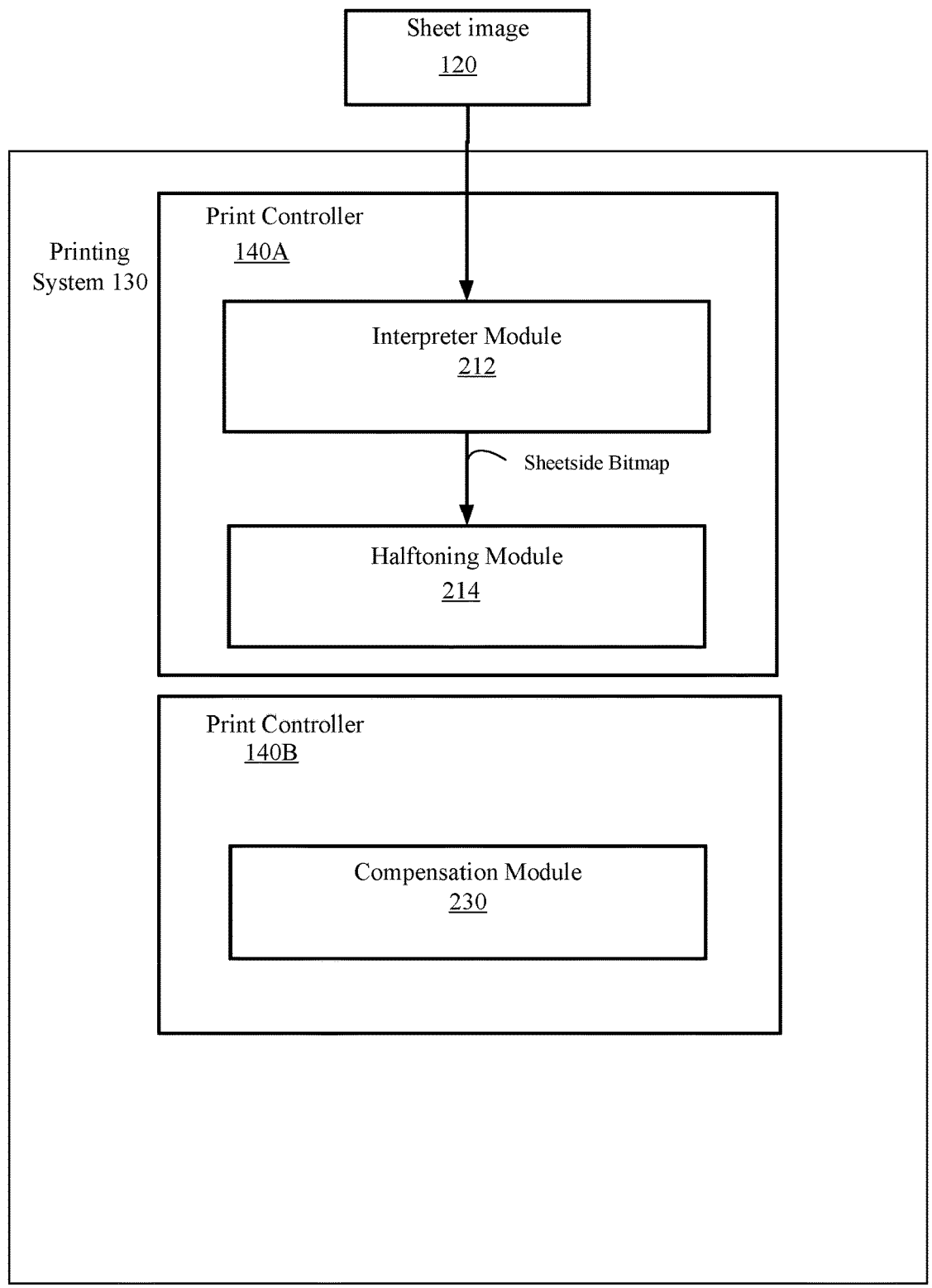

FIG. 2A illustrates a print controller 140 (e.g., DFE or digital front end), in its generalized form, including interpreter module 212, halftoning module 214 and compensation module 230. These separate components may represent hardware used to implement the print controller 140. Alternatively, or additionally, the separate components may represent logical blocks implemented by executing software instructions in a processor of the printer controller 140. FIG. 2B illustrates an alternative embodiment having print controllers 140A&140B. In this embodiment, print controller 140A includes interpreter module 212 and halftoning module 214, and print controller 140B includes compensation module 230. Print controllers 140A and 140B may be implemented in the same printing system 130 (as shown) or may be implemented separately.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 for each primary color are each a 2-dimensional array of pels representing an image of the print job (e.g., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, transfer functions may be implemented by print controller 140 and applied directly to image data as a part of the image processing prior to printing. In that case, the contone image data (CTI) is transformed by the transfer functions prior to halftoning. A transfer function comprises a mapping of an input digital count to an output digital count for a system, where digital count is the gray level or color value representing the pels in a bitmap 150 (FIG. 1). Transfer functions may be used for calibrating printing system 130.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes (e.g., instructed ink drop sizes transmitted to printheads) based on pel location.

In one embodiment, the halftone design may include a finite set of transition thresholds between a finite collection of successively larger drop sizes, beginning with zero and ending with a maximum drop size (e.g., zero, small, medium and/or large). The halftone design may be implemented as threshold arrays (e.g., halftone threshold arrays) such as single bit threshold arrays or multibit threshold arrays. In another embodiment, the halftone design may be implemented as a three-dimensional look-up table with all included gray level values.

In a further embodiment, halftoning module 214 performs the multi-bit halftoning using the halftone design including a set of threshold values for each pel in the sheetside bitmap, where there is one threshold for each non-zero ink drop size. The pel is halftoned with the drop size corresponding to threshold values for that pel. The set of thresholds for a halftone design is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone levels for each pel in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (e.g., a drop size of none where no ink is ejected). Multi-bit halftoning extends the binary threshold array concept to more than one non-zero drop size.

Multi-bit halftoning may use multiple threshold arrays (e.g., multi-bit threshold arrays), one threshold array for each non-zero drop size. The point operation logic is also extended to a set of greater than, less than or equal to operations to determine the drop size by comparing the threshold or thresholds with image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

For multi-bit halftones, the MTA is a three-dimensional array including one two-dimensional array for each drop size (e.g., instructed ink drop size) transition. Thus, an MTA includes a set of two-dimensional arrays of thresholds for transition between drop sizes: a first plane (or plane 1) provides the threshold for the Large output level, while a second plane (or plane 2) and third plane (or plane 3) provide thresholds for the Medium and Small output levels respectively for a system having three drop sizes, not including zero drop size (none or Off). In other embodiments, different one-to-one relationship may be used since the correspondence between plane numbers and drop sizes is a matter of design choice.

To use these threshold arrays for halftoning, each multibit threshold array is tiled across contone image data provided by the sheetside bitmap, which provides a set of threshold values for each pixel in the sheetmap. The contone image data (e.g., digital count, gray level data) is logically compared to the threshold data on a pixel basis. In the case of Large drops, they are produced by the halftoning when the image contone data is greater than the respective large threshold values in plane 1.

Medium drops are produced when the image contone data is greater than the medium drop plane 2 thresholds and the image contone data is less than or equal to the large drop thresholds in plane 1. Small drops are produced when the image contone data is greater than the small drop thresholds in plane 3 and the image contone data is less than or equal to the medium drop thresholds in plane 2.

Finally, the off/none drop size occurs for cases when the contone image data is less than or equal to the small drop thresholds in plane 3. In this embodiment of a two-bit multibit printing system, this set of four logical equations, used with thresholds from each plane of the multibit threshold array permit each printing drop size to be defined based on the contone values.

Alternate versions of the halftoning equations may also be defined. An example of an alternate set of halftoning logical expressions replaces the less than or equal to operation with less than and the greater than operation is replaced with greater than or equal too. A further variation that does not employ a parallel implementation of halftoning uses the less than or equal to and greater than logical expressions starting with the test for the largest drop size first. If a drop size is not found the process continues with the logical expression for the next smallest drop size. If the sequential test for each drop size does not find a drop size, the none drop size is assumed. The threshold arrays for each different set of halftoning equation will vary and therefore the threshold array are generated assuming a given set of equations.

In other embodiments, the number of planes of threshold data can be extended to handle any number of drop sizes. The data of these two-dimensional arrays may be segmented into separate memory regions and stored in any convenient order. For example, the thresholds for each drop size transition may be stored contiguously in memory, and it is often advantageous to do so.

Compensation module 230 performs a compensation process on an un-compensated halftone 218, or previously generated uniformity compensated halftone, received at print controller 140 to generate one or more compensated halftones 220. Compensated halftones 220 are then received at halftoning module 214 along with the sheetside bitmap. In one embodiment, an un-compensated halftone 218 represents a reference halftone design that is modified to create the compensated halftones. In such an embodiment, measurements of the system response (e.g., measurement optical density (OD) data 501) are received via measurement module 190 using the un-compensated halftone 218 for printing the test chart.

Compensation module 230 also performs a compensation process to generate compensated transfer functions 225 based on measurement OD data 501 and target OD data 502. In such an embodiment, measurements of the system response (e.g., measurement optical density (OD) data 501) are received via measurement module 190 using compensated halftone 220 for printing the test chart. Compensated transfer functions 225 are then received at transfer function application module 235. Transfer function application module 235 applies the received compensation transfer functions 225 to print image data received from interpreter module 212 prior to performing halftoning at halftoning module 214. In one embodiment, a transfer function comprises a mapping of an input digital count (or tint) to an output digital count for a system, where digital count is the gray level or color value representing the pels in a bitmap 150 (FIG. 1). Transfer functions may be received or generated (e.g., generated based on target OD versus input digital count data and measured OD versus output digital count data).

Compensation module 230 is further implemented to perform a calibration process to maintain optical density (OD) within printer 160 in order to compensate for OD differences from a target OD. According to one embodiment, compensation module 230 receives a first print substrate transfer function (e.g., print substrate transfer function, print medium transfer function, paper transfer function), receives a first printer transfer function and generates a second printer transfer function based on the first printer transfer function and the first print substrate transfer function. In such an embodiment, the print substrate transfer function is independent of an effect of a print system (e.g. OD changes) and the second printer transfer function is independent of an effect of the print medium.

A printer transfer function (e.g., printerTF, a first printer transfer function) is a mapping of an input digital count to an output digital count for a print system to achieve a first target response (e.g., T1, reference ink deposition, Optical Density target) while printing on a first substrate (e.g., S1 or a reference substrate) with a first halftone design (e.g, a reference halftone design). When the printer transfer function is applied to the print system, the print system becomes a calibrated print system. Print substrate transfer function (e.g., substrateTF) is a mapping of an input digital count to an output digital count for a calibrated print system to achieve a second target response (e.g., T2) while printing onto a second substrate (e.g., S2, a customer substrate) with a first halftone design and the first printer transfer function.

A calibrated print system is a print system that achieves the first target response while printing onto a first substrate with a first halftone design and first printer transfer function. M1 is the measured response corresponding to the target print system printing on the first substrate using the first halftone design and none or an identity transfer function (e.g. digital count output=digital count input). The measurements units for the measured response M1 having the same units as the target response T1. M2 is the measured response corresponding to a calibrated print system printing on the second substrate using the first halftone design and first printer transfer function. T2 is the second target response while printing onto a second substrate with a first halftone design and the first printer transfer function. The measurements units for the measured response M2 having the same units as the target response T2.

A final transfer function (e.g., finalTF) is a transfer function that is the composite of the printer transfer function and the print substrate transfer function. Final transfer function may be written as follows:

$$FinalTF(DC) = substrateTF(printerTF(DC)) = substrateTF \cdot printerTF(DC)$$

FinalTF(DC) is a mathematical composition of the print substrate transfer function and the printer transfer function. The composition f·g of two functions f and g is the function formed by first applying the function g and then the function f. In other words, to apply the composition f·g to an input x, perform the following two steps. First apply the function g to the input x and obtain the result g(x) as the output. Next, apply the function f using g(x) as the input and obtain the result f(g(x)) as the output. The composition may be written as $(f \cdot g)(x) = f(g(x))$ where the "·" symbol represent the mathematical composition function.

Final transfer function FinalTF may be generated from M1, M2, T1 and T2 as follows, where $M1^{-1}$ and $M2^{-1}$ are the mathematical inverse function of M1 and M2 respectively. The FinalTF itself is a composition of four different functions:

$$FinalTF(DC) = M2^{-1}(T2(M1^{-1}(T1(DC))))$$

One technical benefit of the printer transfer function is that it creates a calibrated print system when the printer transfer function is applied to a print system corresponding to the print system that was the basis for the printer transfer function.

One technical benefit of the print substrate transfer function is that when applied to a calibrated print system (e.g., any calibrated print system), it causes the print response to achieve the second target response (e.g., the customer's desired target response) when printing on the second substrate (e.g., the customer's paper) with the first halftone design and printer transfer function.

Generating updated printer transfer functions or updated print substrate transfer functions provides technical benefits such as providing control input that may be used by print systems to achieve desired output response targets despite property changes in the print system and print substrate, respectively. Generating the print substrate transfer function for different substrates (e.g., different material, mass, thickness or surface treatments) provides technical benefits that include providing control input that may be used by print systems to achieve desired printer output response targets despite the print system switching between different input substrates. The generated transfer functions are available to be applied to the corresponding print systems with corresponding print substrates.

Figure 3:
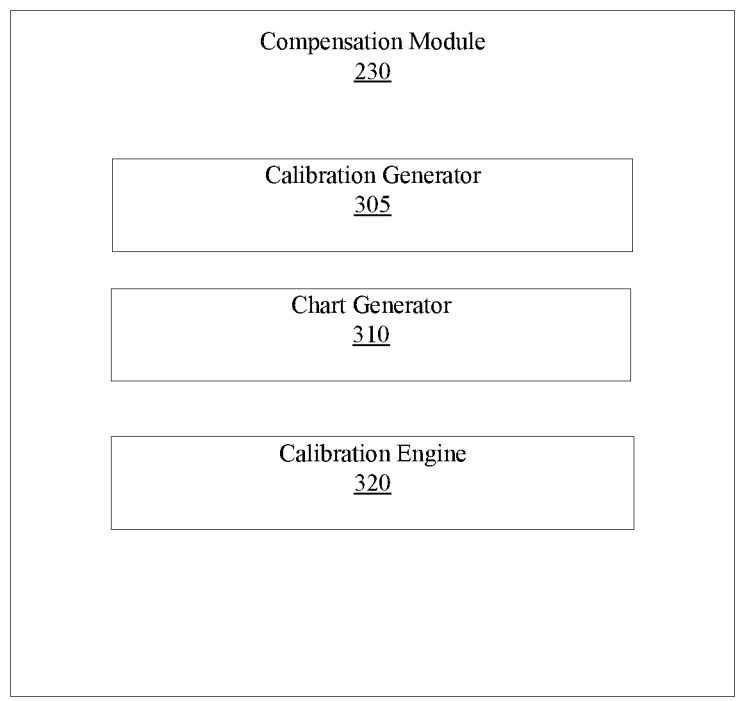
FIG. 3 illustrates one embodiment of compensation module.

FIG. 3 illustrates one embodiment of compensation module 230 including a calibration generator 305, chart generator 310 and calibration engine 320. Calibration generator 305 facilitates a calibration process at print system 130. In one embodiment, the calibration process is performed to update the print system (or printer) transfer function for long term printer OD change compensation. In such an embodiment, each calibration is based on a previous calibration performed using a print substrate (e.g., medium) to be implemented to print jobs (or customer paper) at printing system 130. In a further embodiment, each calibration may be initiated by a system operator.

Chart generator 310 prints a test chart upon initiation of a calibration process. In one embodiment, chart generator 310 generates an image (e.g., print image for the test chart) that is subsequently processed by measurement module 190 to generate OD measurement data. In a further embodiment, first measurement data is generated that is associated with an image printed on paper during a first calibration process using a printer transfer function and/or a print substrate transfer function. Similarly, second measurement data is generated by printing the image during a subsequent calibration process on a paper using a printer transfer function and a print substrate transfer function. In one embodiment, the substrate paper used during a subsequent paper substrate calibration may be the same or different than the initial substrate.

Figure 4:
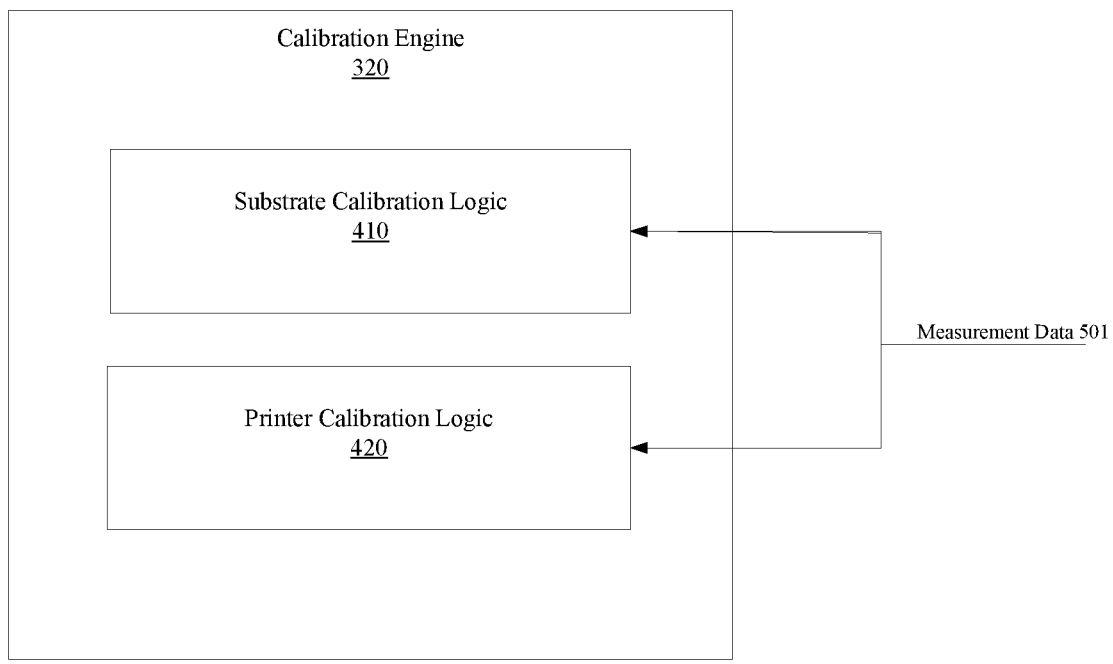
FIG. 4 illustrates one embodiment of calibration engine.

Calibration engine 320 receives the first and second measurement data and generates the print substrate transfer functions and the printer transfer functions. FIG. 4 illustrates one embodiment of calibration engine 320 including substrate calibration logic 410 and printer calibration logic 420 receiving measurement data 501. Substrate calibration logic 410 is implemented to generate a print substrate transfer function for each customer paper that is to be used at printing system 130.

In one embodiment, substrate calibration logic 410 generates updated (or corrected) print substrate transfer functions to compensate for changes to the printer transfer function. In such an embodiment, substrate calibration logic 410 first generates a temporary (or intermediate) print substrate transfer function based on a current printer transfer function (e.g., PTF_k, where k represents an index of printer transfer functions). Thus, PTF_k, is used to measure samples on customer paper to determine a print substrate transfer function (e.g., paperTF_i_j, where i is an index of different papers and j is index of repeat substrate TFs for the same paper).

In a further, embodiment, substrate calibration logic 410 generates the corrected print substrate transfer function (e.g., corrsubstrateTF_i_j) based on the substrateTF_i_j, updated printer transfer function (e.g., PTF_k+1) and current printer transfer function (e.g., PTF_k). In this embodiment, substrate calibration logic 410 generates corrsubstrateTF_i_j by an approximation based on the substrateTF_i_j, PTF_k+1 and PTF_k. The latest versions of PTF and corrsubstrateTF are used for printing on the substrate associated with corrsubstrateTF.

Figure 5:
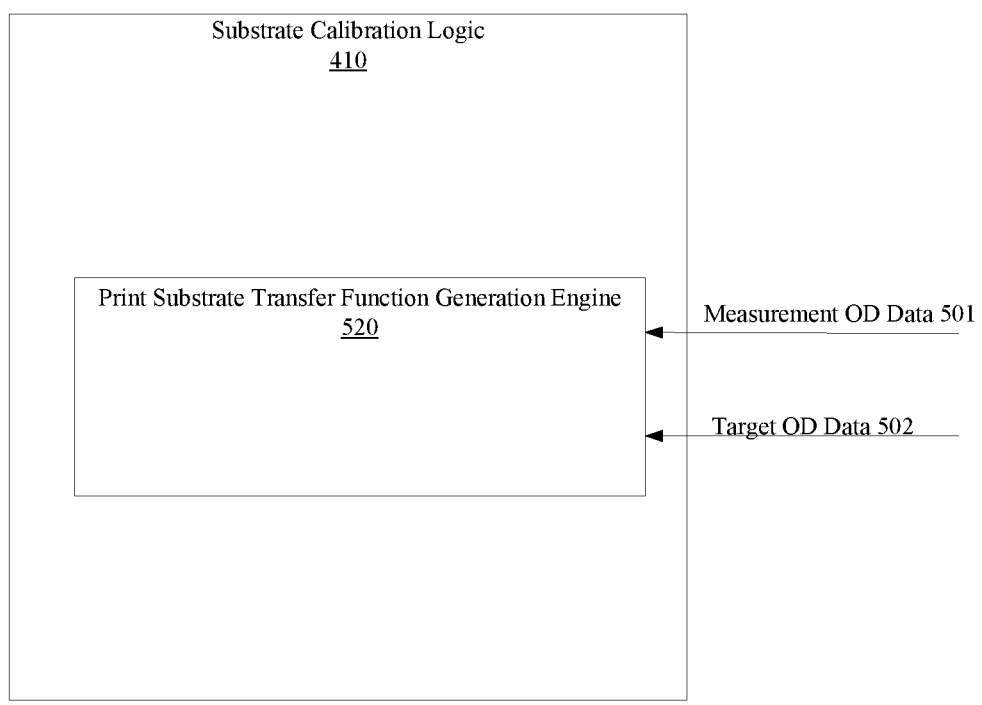
FIG. 5 illustrates one embodiment of substrate calibration logic.

FIG. 5 illustrates one embodiment of substrate calibration logic 410. As shown in FIG. 5, substrate calibration logic 410 includes print substrate transfer function generation engine 520 that receives measurement OD data 501 for a new customer paper from measurement module 190 and OD target OD data 502 and generates a print substrate transfer function based on the measurement OD data 501 and the target OD data 502.

Figure 6:
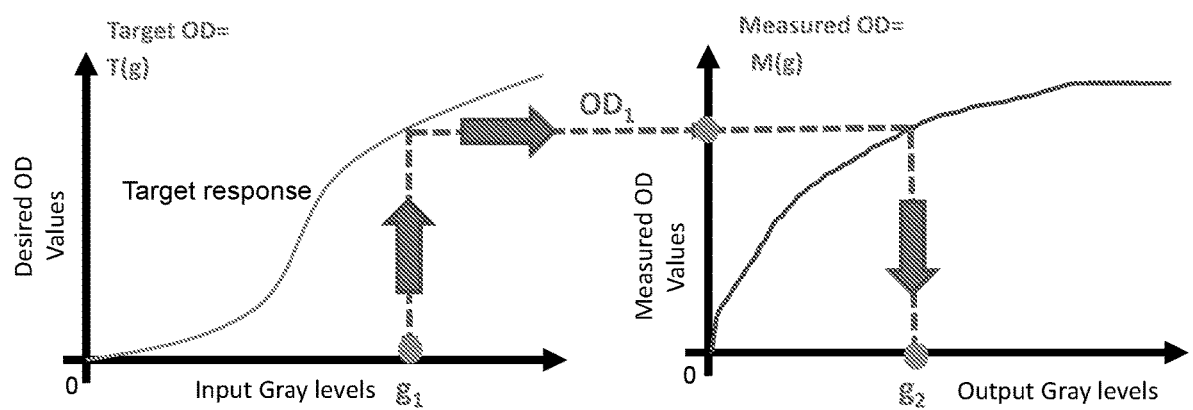
FIG. 6 illustrates one embodiment of a transfer function.

FIG. 6 illustrates one embodiment of a transfer function for all digital count levels (e.g., gray levels). Target OD data T(g) (e.g, target OD data 502) is used as the objective for an applied current halftone with an identity transfer function or current halftone with applied current printer transfer function. The measured response is given by M(g) (e.g., measurement OD data 501). The measured response is determined by printing a single color corresponding to the ink. Given the known response, at gray level $g_1$ the target OD is $OD_1$. To achieve $OD_1$, print level $g_2$ is printed. Using 0:255 for $g_1$ the set of $g_2$ values defines the transfer function. The transfer function represented as a continuous function defines: g_output=TF(g_input). The expression for the transfer function can be written in terms of the target T and inverse measured responses $M^{-1}$, such that:

$$g\_output = M^{-1}(T(g\_input)) = TF(g\_input)$$

Using g_output values as replacement values for the corresponding g_input values, the calibrated target response is achieved for all levels.

Figure 7:
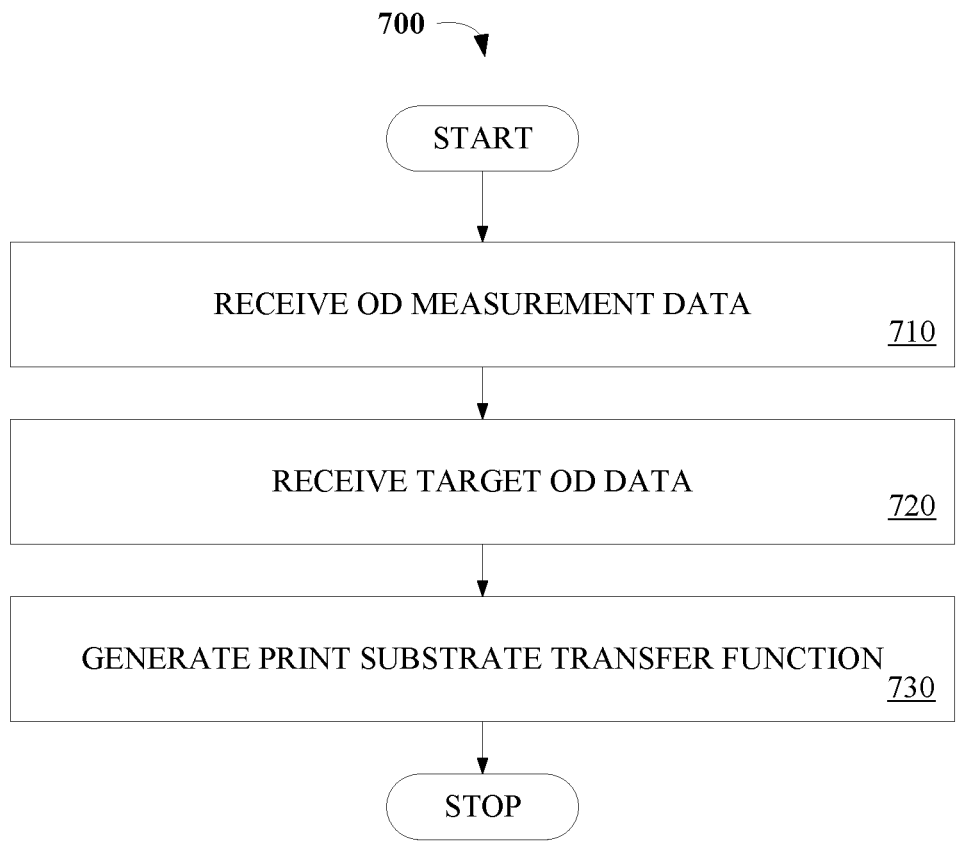
FIG. 7 is a flow diagram illustrating one embodiment of a process for generating a print substrate transfer function.

FIG. 7 is a flow diagram illustrating one embodiment of a process 700 for generating a print substrate transfer function. Process 700 may be performed by processing logic that may include hardware (e.g., circuitry, dedicated logic, programmable logic, microcode, etc.), software such as instructions run on a processing device, or a combination thereof. In one embodiment, process 700 is performed by calibration engine 320.

Process 700 begins at processing block 710, where OD measurement data is received. At processing block 720, target OD data is received. At processing block 730, the substrate transfer function substrateTF_i_j is generated based on the OD measurement data 501 and target OD data 502.

Figure 8:
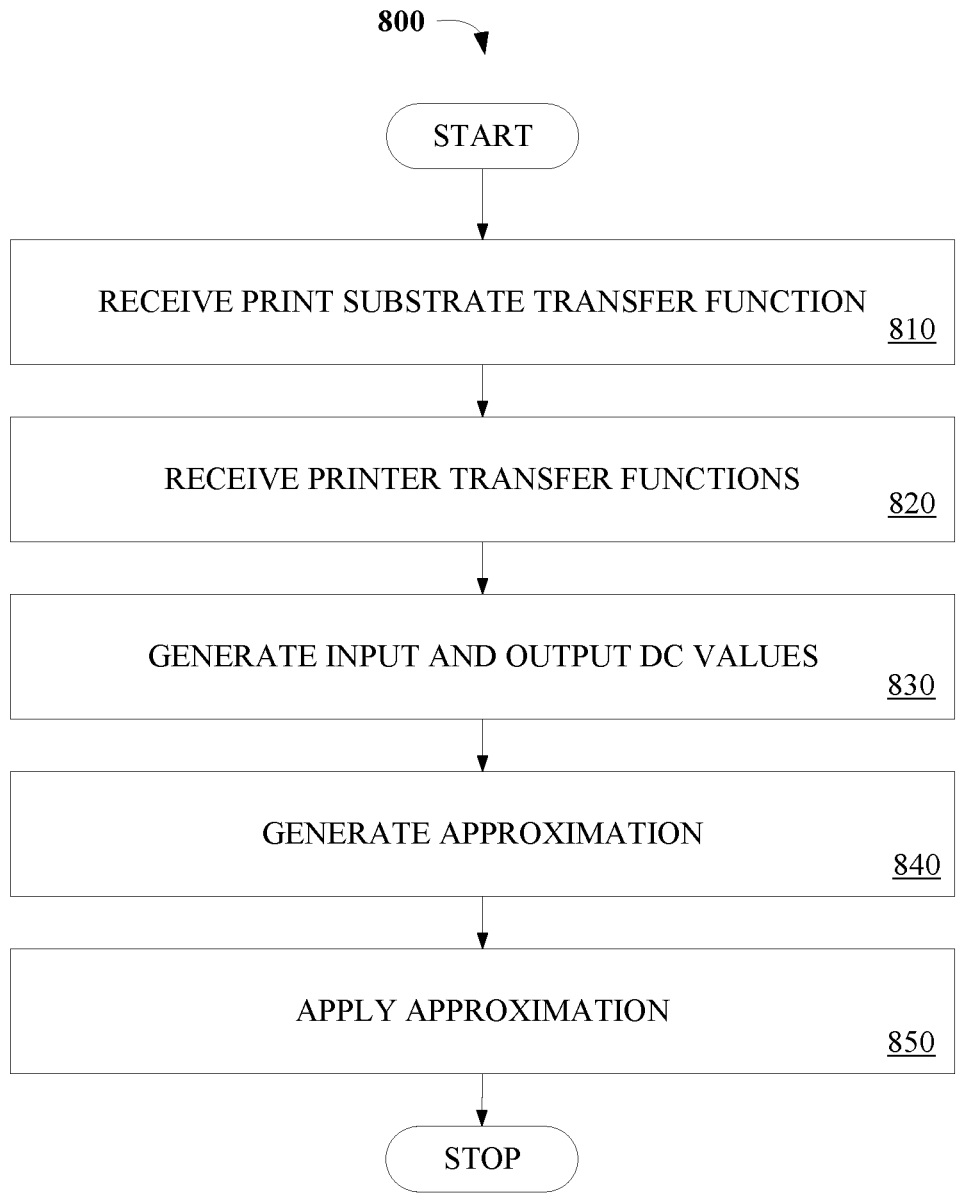
FIG. 8 is a flow diagram illustrating another embodiment of a process for generating a print substrate transfer function.

Print substrate transfer function generation engine 520 also generates corrected print substrate transfer functions (corrsubstrateTF_i_j) based on an approximation between substrateTF_i_j, PTK_k and the updated printer transfer function PTF_k+1. FIG. 8 is a flow diagram illustrating one embodiment of a process 800 for generating a corrected print substrate transfer function. Process 800 may be performed by processing logic that may include hardware (e.g., circuitry, dedicated logic, programmable logic, microcode, etc.), software such as instructions run on a processing device, or a combination thereof. In one embodiment, process 800 is performed by calibration engine 320.

Process 800 begins at processing blocks 810 and 820 where a print substrate transfer function (substrateTF_i_j and a printer transfer functions PTF_k+1 and PTF_k are received. At processing block 830, corrected substrate input and output values are generated for each DC value, such that corrsubstrateTF_i_j input value s=PTF_k+1(DC) and corrsubstrateTF_ij output values=paperTF_ij (PTF_k (DC)). At processing block 840, an approximation is generated based on the corrsubstrateTF i_j input and output values. In one embodiment, the approximation comprises a spline interpolation where the interpolating function is a special type of piecewise polynomial called a spline. At processing block 850, the approximation is applied to determine corrsubstrateTF_i_j output values for integer input values to obtain corrsubstrateTF_i_j in a standard transfer function format where input values are integers.

Figure 9:
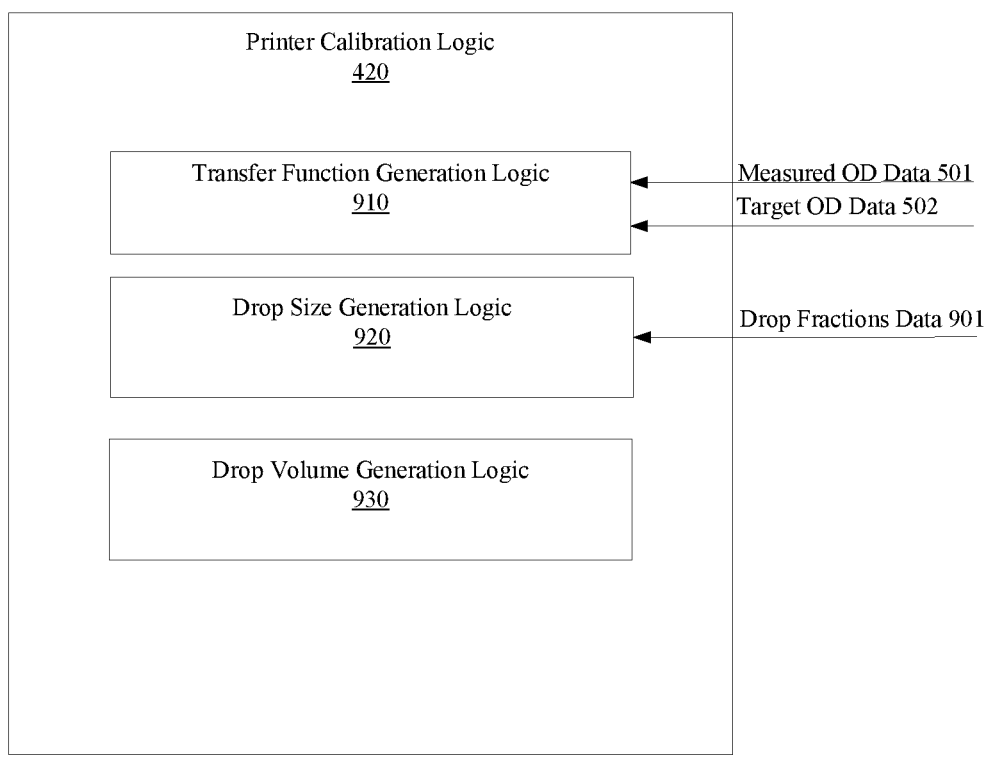
FIG. 9 illustrates one embodiment of printer calibration logic.

Referring back to FIG. 4, printer calibration logic 420 generates printer transfer functions. In one embodiment, printer calibration logic 420 generates updated printer transfer functions (PTF_k+1) based on previous calibrations that generate print substrate transfer functions (substrateTF_i_j). FIG. 9 illustrates one embodiment of printer calibration logic 420. As shown in FIG. 9, printer calibration logic 420 includes transfer function generation logic 910 that receives measured OD data 501 and target OD data 502. In one embodiment, transfer function generation logic 910 generates an initial printer transfer function (PTF_0) for a reference printer calibration paper based on the measured OD data 501 target OD data 502 using measurements from the reference printer calibration paper and target OD response for the printer calibration paper.

Printer calibration logic 420 also includes drop size generation logic 920 that is implemented to generate drop size data for all drop sizes and all digital counts based on received drop fractions 901 for the printer halftone, as well as print substrate transfer functions (e.g., substrateTF_i_0 and substrateTF_i_j) and printer transfer functions (e.g., PTF_0 and PTF_k−1). Drop size generation logic 920 computes transfer functions TF1 (e.g., substrateTF_i_0 (PTF_0(DC))) and TF2 (e.g., substrateTF_i_j(PTF_k−1 (DC))). Subsequently, a row of drop fraction matrices are generated using $Z^0$ and Z for TF1(DC) and TF2(DC), respectively, for DC levels, such that:

$$Z^0 = \begin{bmatrix} z^0_{0,0} & \cdots & z^0_{0,D-1} \\ \vdots & \ddots & \vdots \\ z^0_{P-1,0} & \cdots & z^0_{P-1,D-1} \end{bmatrix} \text{ and } v^0 = \begin{bmatrix} v^0_0 \\ \vdots \\ v^0_{D-1} \end{bmatrix}; \text{ and}$$

$$Z = \begin{bmatrix} z_{0,0} & \cdots & z_{0,D-1} \\ \vdots & \ddots & \vdots \\ z_{P-1,0} & \cdots & z_{P-1,D-1} \end{bmatrix}; \text{ and } v = \begin{bmatrix} v_0 \\ \vdots \\ v_{D-1} \end{bmatrix},$$

As shown above, each of elements $Z^0_{p,d}$ and $Z_{p,d}$ in drop fraction matrices $Z^0$ and Z, correspond to a different digital count level based on the row index (p) and instructed ink drop size based on the column index (d). In one embodiment, each row of elements in drop fraction matrices $Z^0$ and Z is associated with a different digital count level and each column of elements is associated with a different instructed drop size; where there are P different digital count levels and D different drop sizes. Drop fractions are defined as the fraction of drops in the halftone threshold array (domain=[0,1]) for a given drop size ($v^o_d$ and $v_d$) in the drop size column vector and the associated digital count $DC_p$. Drop fractions are determined for each drop size and vary from zero to one, where one indicates for a given DC level that the halftoned result for every pel in the halftone threshold array will be the given drop size. Drop fraction matrix indicates the degree to which the different drop sizes (e.g., $v^o_d$ and $v_d$) of the halftone are printed on average for each different $DC_p$ level, assuming a constant tint level synthetic image is being printed as defined by the $DC_p$ level. In such an embodiment, digital count (e.g., [0,(2^bitdepth)−1]) is the gray level or color value for the different images in the synthetic image job. Bitdepth defines the number of available levels as a power of two. In the previously cited example, the bitdepth is 8, producing 256 total images in the synthetic image job used to determine drop fractions. In such an embodiment, ink usage drop fraction (e.g., drop fraction) data represents the number of drops for a specific instructed drop size at a given DC level divided by the total number of drops possible for a halftone design.

Index p ranges from zero to P−1, where P is the total number of digital count levels. Index d ranges from zero to D−1, where D is the total number of instructed ink drop sizes, not including the ink drop size none. The ink drop size column vector v comprises ink amount values (e.g., $v_0$–$v_{D-1}$) associated with each of the plurality of instructed ink drop sizes in an initial drop size column vector. In a further embodiment, the drop amounts $v_0$ are known (e.g., pre-determined) and is referred to as known drop size data, while v comprises unknown drop amounts.

Once the drop size column vectors are generated, drop size generation logic 920 generates a set of simultaneous linear equations based on drop fractions for all DC and known drop size data (drop size 1 $v_0$), and solves the set of linear equations to generate a least square estimate for drop size 2 (e.g., v) using pseudo inverse. Drop size generation logic 920 saves drop size 2 as the drop size data estimate for iteration k.

Drop volume generation logic 930 generates ink volume (or volume) data (e.g., h0(DC) and g_k (DC)) for all digital counts based on substrateTF_i_0(PTF_0(DC)) and substrateTF_i_j(PTF_k(DC)) (e.g., for a first iteration). In one embodiment, drop volume generation logic 930 receives a halftone design (HT1) that is used to generate drop fractions data for all drop sizes (e.g., dfSmallHT1(DC), dfMediumHT1(DC) and dfLargeHT1(DC) assuming four total drop sizes). The drop fractions data is then used to generate the volume data h0(DC) and g_k(DC). In one embodiment, volume data h0(DC) is generated using the drop fractions data, PTF_0 and the drop size 1 (e.g., drop sizes smallSize1, mediumSize1, and largeSize1). Thus, the generation of h0(DC) may be represented as:

$$h0(DC)=(dfSmallHT1(PTF\_0(DC))*smallSize1)+\\(dfMediumHT1(PTF\_0(DC))*mediumSize1)+\\(dfLargeHT1(PTF\_0(DC))*largeSize1)$$

Volume data g_k (DC) is generated using the drop fractions data and the drop size 2 data generated at drop size generation logic 920, such that:

$$g\_k(DC)=dfSmallHT1(DC)*smallSize2\_k+dfMediumHT1(DC)*mediumSize2\_k+dfLargeHT1(DC)*largeSize2\_k$$

Additionally, drop size generation logic 920 generates the inverse of g_k(DC) as $g\_k^{-1}$(DC). According to one embodiment, transfer function generation logic 910 generates PTF_k+1 using $g\_k^{-}$, such that:

$$PTF\_k+1=g\_k^{-1}(h0(DC))$$

Subsequently, PTF_k+1 is saved and/or transmitted (e.g., to printing system 130 to be used for printing. As discussed above, PTF_k+1 is also applied to substrateTF_i_j to generate corrsubstrateTF_i_j.

Figure 10:
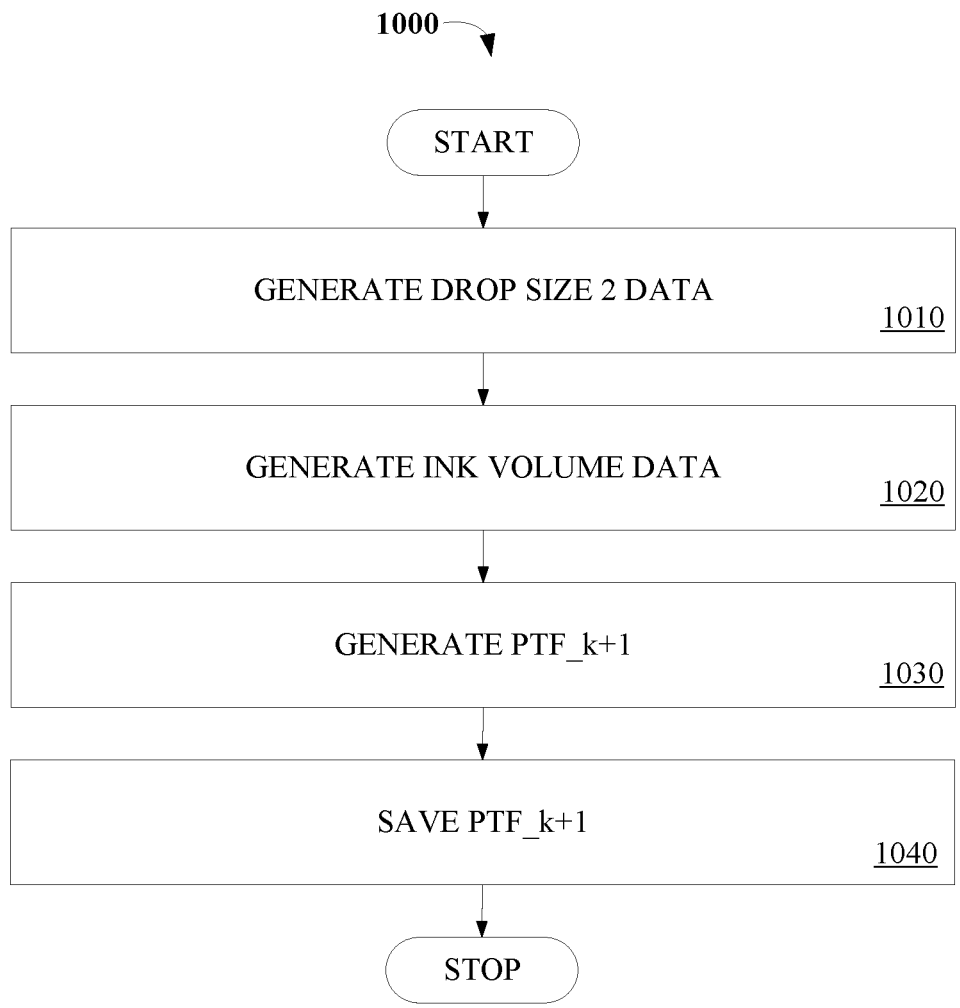
FIG. 10 is a flow diagram illustrating one embodiment of a process for generating a printer transfer function.

FIG. 10 is a flow diagram illustrating a process 1000 for generating a printer transfer function. Process 1000 may be performed by processing logic that may include hardware (e.g., circuitry, dedicated logic, programmable logic, microcode, etc.), software such as instructions run on a processing device, or a combination thereof. In one embodiment, process 1000 is performed by calibration engine 320.

At processing block 1010, drop size 2 (e.g., column vector v) data is generated. At processing block 1020, ink volume data h0 (DC) and g k(DC) are generated. At processing block 1030, the printer transfer function (PTF_k+1) is generated based on the ink volume data h0(DC) and $g\_k^{-1}$ (DC). At processing block 1040, PTF_k+1 is saved.

Figure 11A:
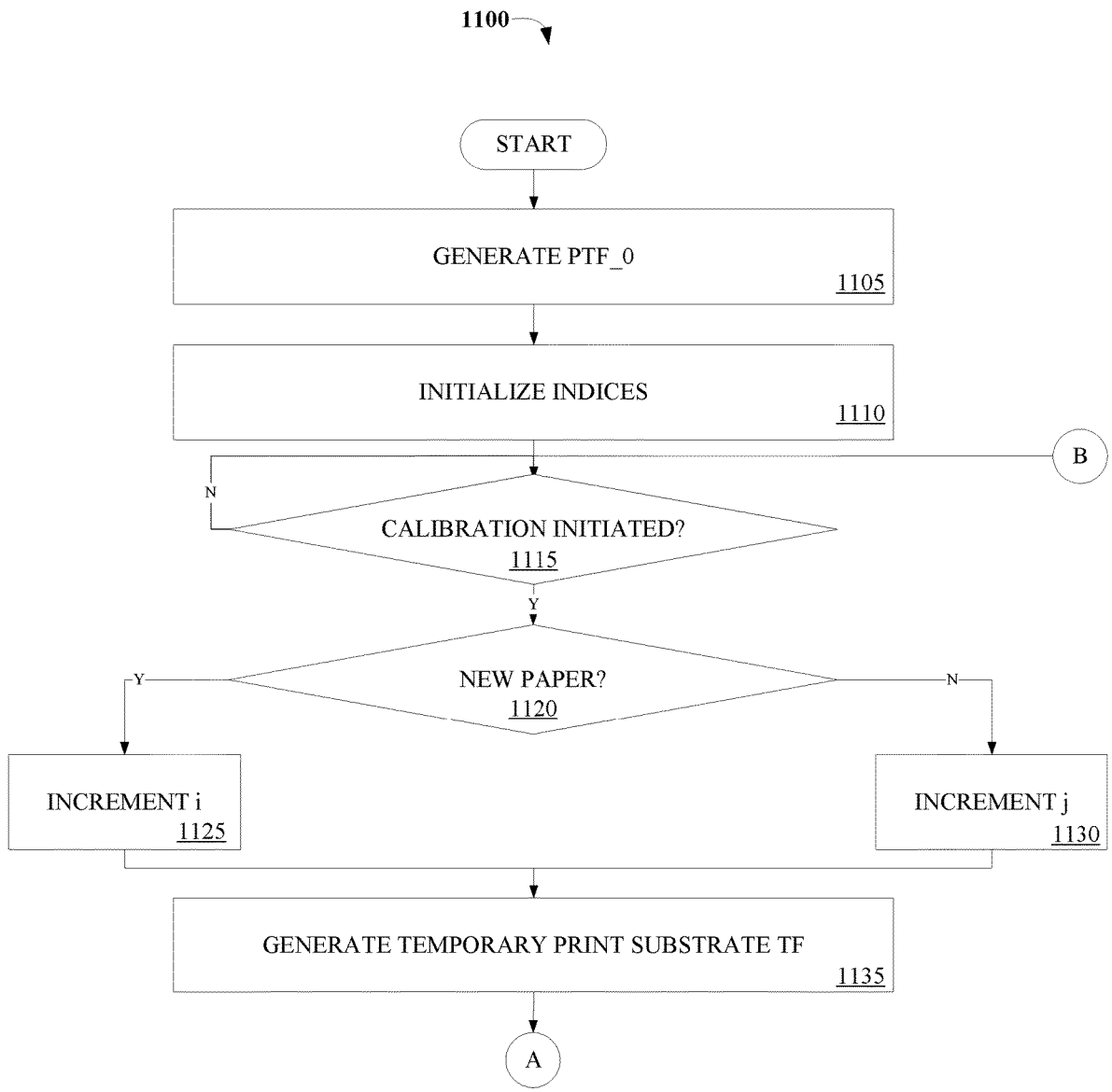
FIGS. 11A & 11B is a flow diagram illustrating one embodiment of a calibration process.
Figure 11B:
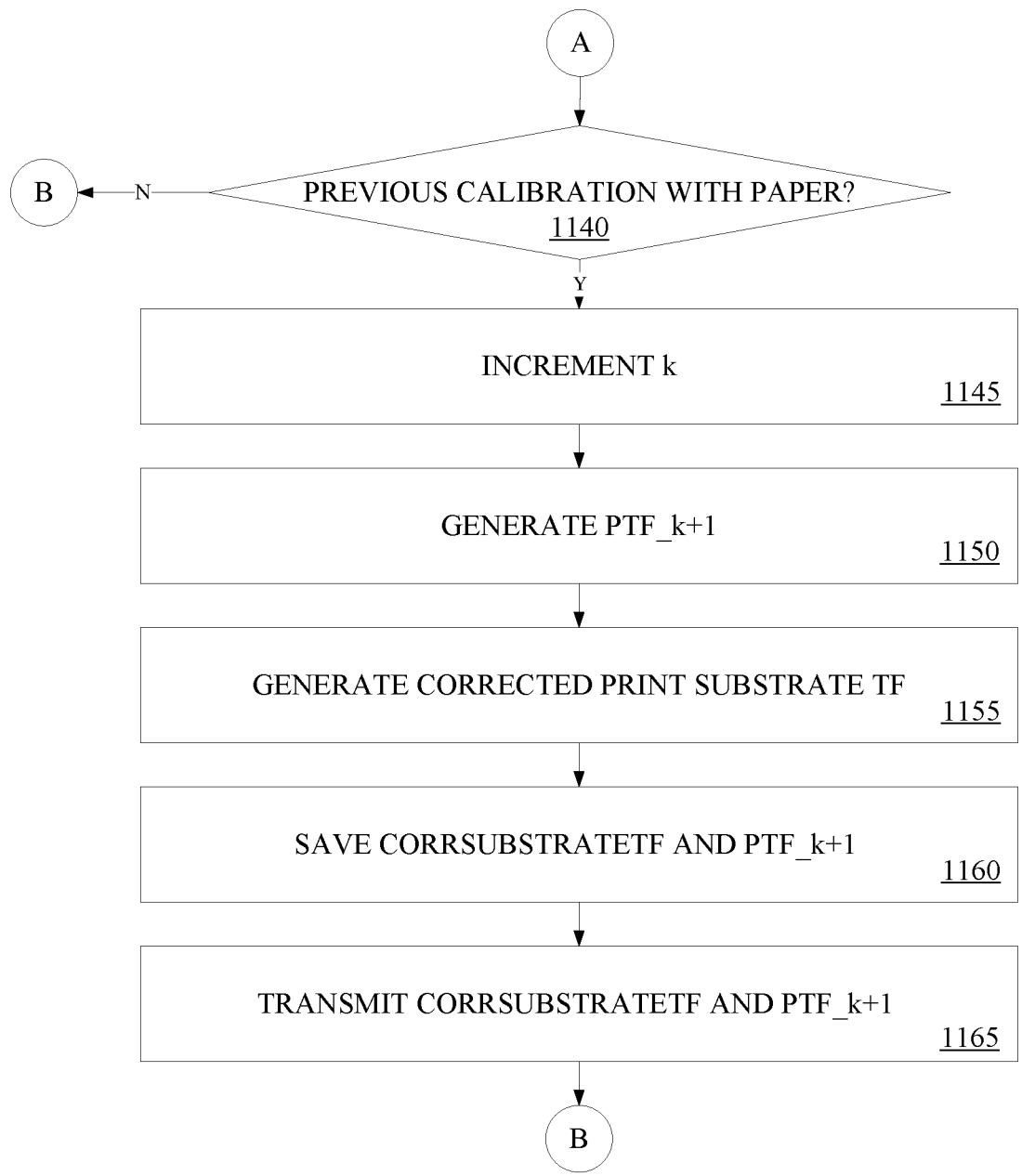

FIGS. 11A & 11B is a flow diagram illustrating one embodiment of a calibration process 1100. Process 1100 for generating a printer transfer function and a print substrate transfer function. Process 1100 may be performed by processing logic that may include hardware (e.g., circuitry, dedicated logic, programmable logic, microcode, etc.), software such as instructions run on a processing device, or a combination thereof. In one embodiment, process 1100 is performed by calibration engine 320.

Process 1100 begins at processing block 1105 (FIG. 11A) where an initial printer transfer function (PTF_0) is generated. As discussed above, PTF_0 is generated based on measurement OD data 501 and target OD data 502 using the printer reference substrate paper. At processing block 1110, indices i, j and k are initialized (e.g., i=−1; j=0; k=0). As previously mentioned, j and k represent iterations of print medium and printer transfer functions, respectively, while i represents iterations for different substrates.

At decision block 1115, a determination is made as to whether the calibration process has been initiated (e.g., by a print system 130 operator). If not, control remains at decision block 1115 until the calibration process is initiated. Otherwise, a determination is made as to whether the paper to be used for calibration is a new paper, decision block 1120. Index i is incremented upon a determination that the paper is a new paper, processing block 1125. However, index j is incremented upon a determination that the paper is a previously used paper, processing block 1130. A new paper may be detected by print controller 140 upon a determination that a new substrate is added to the substrate catalog (e.g., a listing of substrates that may be used for printing) that contains information for each substrate or by operator input received from a user interface of print controller 140.

At processing block 1135, a temporary print medium (e.g., substrateTF_i_j) is generated. At decision block 1140 (FIG. 11B), a determination is made as to whether a previous calibration has been performed with the current paper. If not, control is returned to processing block 1115 to wait for a subsequent calibration. However, k is incremented (e.g., 0 to 1) upon a determination that a previous calibration has been performed with the current paper, processing block 1145.

At processing block 1150, a printer transfer function (e.g., PTF_k+1) is generated as discussed with reference to FIGS. 9 and 10. At processing block 1155, the corrected print substrate transfer function (e.g., corrsubstrateTF_i_j) is generated. At processing block 1160, the corrected print substrate transfer function and the printer transfer function are saved. At processing block 1165, the corrected print substrate transfer function and the printer transfer function are transmitted (e.g., to print controller 140A). Subsequently, control is returned to processing block processing block 1115 to wait for a subsequent calibration.

Figure 11C:
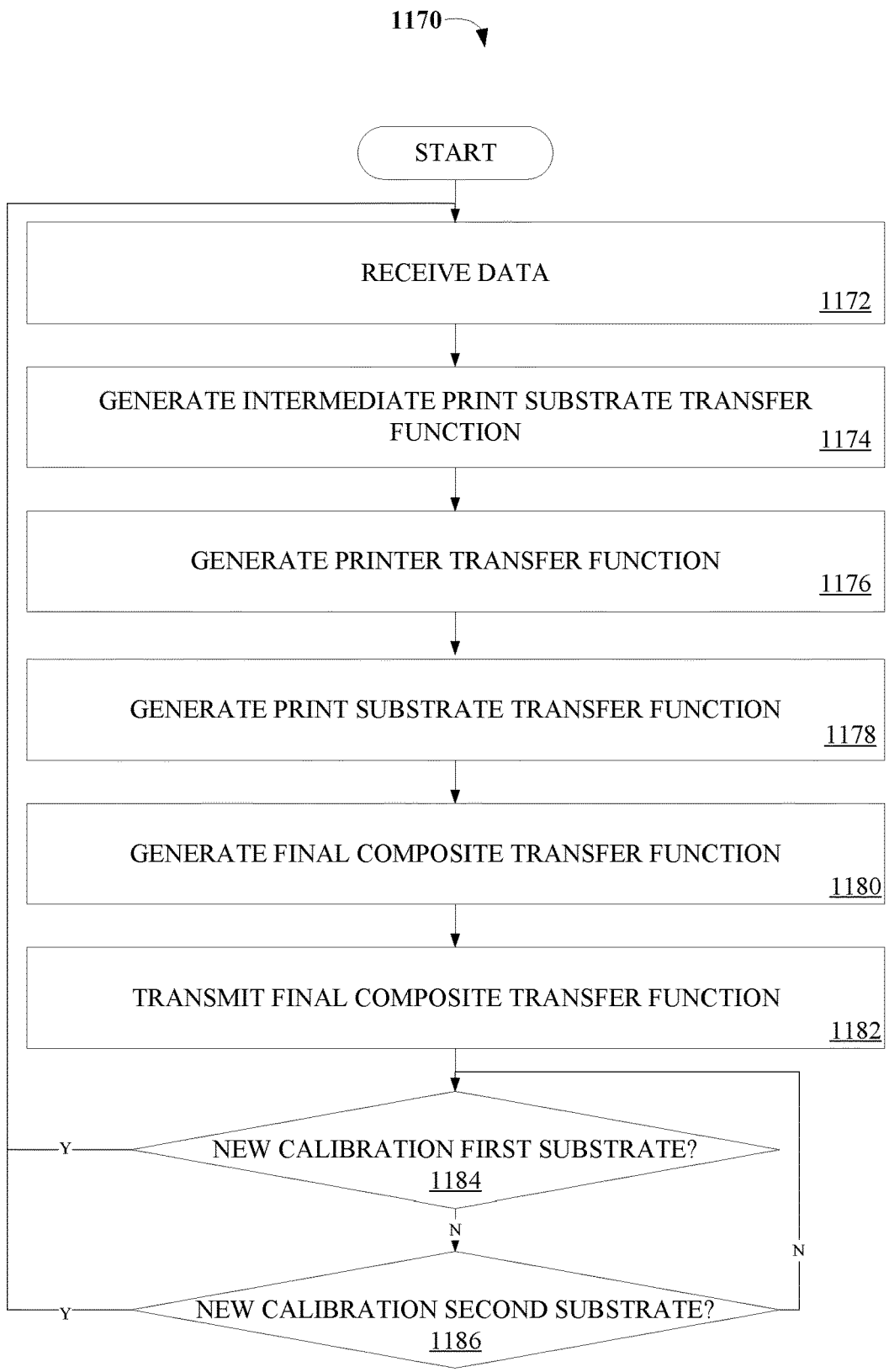
FIG. 11C is a flow diagram illustrating another embodiment of a calibration process.

FIG. 11C is a flow diagram illustrating another embodiment of a calibration process 1170. Process 1170 for generating a printer transfer function and a print substrate transfer function. Process 1170 may be performed by processing logic that may include hardware (e.g., circuitry, dedicated logic, programmable logic, microcode, etc.), software such as instructions run on a processing device, or a combination thereof. In one embodiment, process 1170 is performed by calibration engine 320.

Process 1170 begins at processing block 1172 where data is received. In one embodiment, the received data comprises a reference halftone design, reference ink drop size data, a reference printer transfer function (corresponding to the reference halftone design, a reference printer response target and a reference print substrate), first print measurement data (corresponding to the reference halftone design, the reference printer transfer function and a first print substrate) and a first printer response target. At processing block 1174, an intermediate (e.g., first intermediate or second intermediate) print substrate transfer function is generated based on the first print measurement data and the first printer response target.

At processing block 1176, a printer transfer function (e.g., first printer transfer function or second printer transfer function) is generated based on the first intermediate print substrate transfer function, the reference halftone design, the reference ink drop size data and the reference printer transfer function. At processing block 1178, a print substrate transfer function (e.g., a first print substrate transfer function or a second print substrate transfer function) is generated as an approximation of a function with input values determined as the first printer transfer function (iteration k+1) evaluated at digital count values and output values determined as the composition of the first intermediate print substrate transfer function and the reference printer transfer function (iteration k) evaluated at the digital count values.

A processing block 1180, a final composite transfer function is generated based on the printer transfer function and the print substrate transfer function. At processing block 1182, the final composite transfer function, and/or printer transfer function and/or print substrate is transmitted. At decision block 1184, a determination is made as to whether a new (e.g., updated) calibration for the first substrate (e.g., a request for a new calibration for the first substrate) is received. If so, control is returned to processing block 1172, where updated data is received to repeat process 1170. Otherwise, determination is made as to whether a new calibration for a second substrate (e.g., a request for a new calibration for a second substrate) is received, decision 1186. Requests for calibration may be initiated by print controller 140 based on input received from a user interface in printing system 130 and/or the printer catalog data. Control is again returned to processing block 1172 upon a determination that a new calibration second substrate is received. Otherwise, control is returned to decision block 1184 where a determination is again made as to whether a new calibration first substrate is received.

Considering a single pass through process 1170 blocks 1172-1182 as shown in FIG. 11C for a single substrate (e.g., i=1, a first substrate), substrateTF_1_0 (e.g., the first intermediate print substrate transfer function) is generated in the 1174 process. A printer transfer function PTF_1 (e.g., the first printer transfer function) is generated by the 1176 process. The process 1178 generates corrsubstrateTF_1_1 (e.g., the first print substrate transfer function) to reflect the changes made to the printer transfer function to compensate for printer OD changes. Composite transfer function corrsubstrateTF_1_1(PTF_1) (e.g., a first composite transfer function) is transmitted in block 1182. Printing using the i=1 substrate would employ the transmitted composite transfer function corrsubstrateTF_1_1(PTF_1).

Subsequent to the single pass of process 1170 steps 1172-1182 and a determination of Yes at process block 1184 (e.g., i=1, a first substrate), process 1170 generates substrateTF_1_2 (e.g., the updated first intermediate print substrate transfer function), printer transfer function PTF_2 (e.g., the updated first printer transfer function), corrsubstrateTF_1_2 (e.g., the updated first print substrate transfer function) and the composite transfer function corrsubstrateTF_1_2 (PTF_2) (e.g., an updated first composite transfer function). In that case, generating the updated first printer transfer function and generating the updated first print substrate transfer function comprises the first print substrate transfer function and the reference printer transfer function as baseline references.

Subsequent to the single pass of process 1170 steps 1172-1182, a determination of No at process block 1184 and a determination of Yes at process block 1186 (e.g., i=2, a second substrate), process 1170 generates substrateTF_2_0 (e.g., the second intermediate print substrate transfer function), printer transfer function PTF_3 (e.g., the third printer transfer function), corrsubstrateTF_2_1 (e.g., the second print substrate transfer function) and the composite transfer function corrsubstrateTF_2_1(PTF_3) (e.g., a second composite transfer function).

Figure 12:
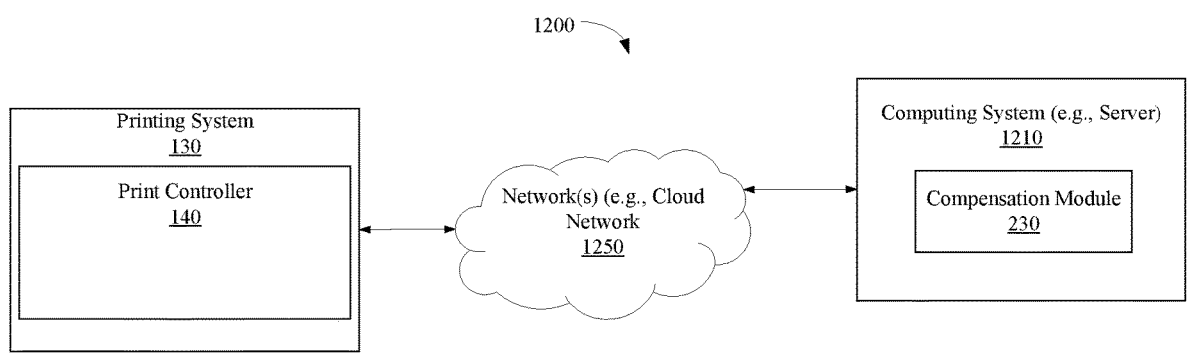
FIG. 12 illustrates one embodiment of a compensation module implemented in a network.

Although shown as a component of print controller 140, other embodiments may feature compensation module 230 included within an independent device communicably coupled to print controller 140. For instance, FIG. 12 illustrates one embodiment of compensation module 230 implemented in a network 1200. As shown in FIG. 12, compensation module 230 is included within a computing system 1210 and communicates with printing system 130 via a cloud network 1250.

Figure 13:
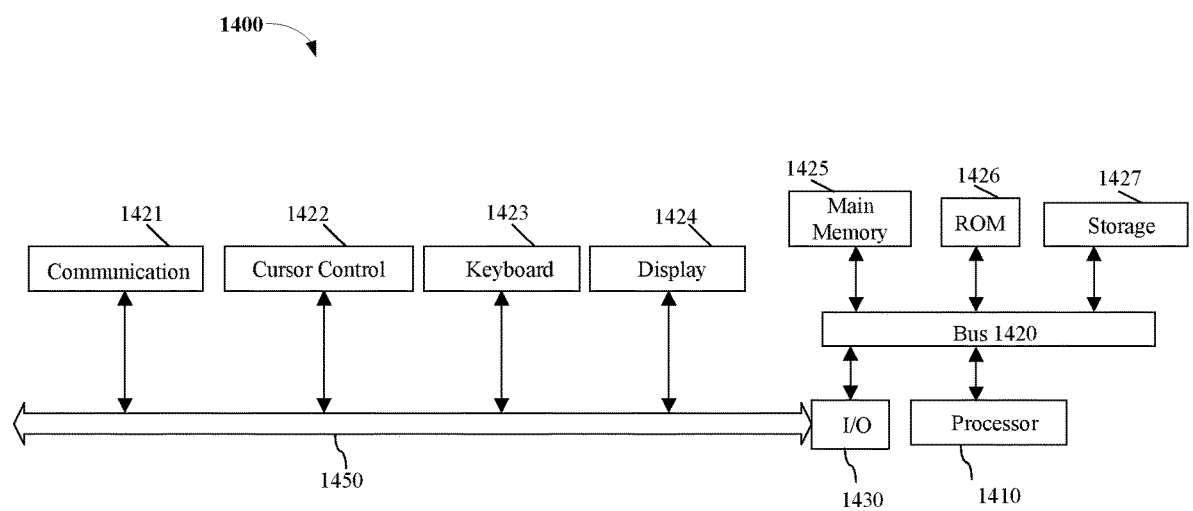
FIG. 13 illustrates one embodiment of a computer system.

FIG. 13 illustrates a computer system 1400 on which printing system 130, print controller 140 and compensation module 230 may be implemented. Computer system 1400 includes a system bus 1420 for communicating information, and a processor 1410 coupled to bus 1420 for processing information.

Computer system 1400 further comprises a random access memory (RAM) or other dynamic storage device 1425 (referred to herein as main memory), coupled to bus 1420 for storing information and instructions to be executed by processor 1410. Main memory 1425 also may be used for storing temporary variables or other intermediate information during execution of instructions by processor 1410. Computer system 1400 also may include a read only memory (ROM) and or other static storage device 1426 coupled to bus 1420 for storing static information and instructions used by processor 1410.

A data storage device 1427 such as a magnetic disk or optical disc and its corresponding drive may also be coupled to computer system 1400 for storing information and instructions. Computer system 1400 can also be coupled to a second I/O bus 1450 via an I/O interface 1430. A plurality of I/O devices may be coupled to I/O bus 1450, including a display device 1424, an input device (e.g., an alphanumeric input device 1423 and or a cursor control device 1422). The communication device 1421 is for accessing other computers (servers or clients). The communication device 1421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store calibration logic and one or more processors coupled with the at least one physical memory device to execute the calibration logic to receive a reference halftone design, receive reference ink drop size data, receive a reference printer transfer function corresponding to the reference halftone design, a reference printer response target and a reference print substrate, receive first print measurement data corresponding to the reference halftone design, the reference printer transfer function and a first print substrate, receive first printer response target, generate a first intermediate print substrate transfer function based on the first print measurement data and the first printer response target, generate a first printer transfer function based on the first intermediate print substrate transfer function, the reference halftone design, the reference ink drop size data and the reference printer transfer function and generate a first print substrate transfer function as an approximation of a function with input values determined as the first printer transfer function evaluated at digital count values and output values determined as the composition of the first intermediate print substrate transfer function and the reference printer transfer function evaluated at the digital count values, wherein a transfer function comprises a mapping of an input digital count to an output digital count.

Example 2 includes the subject matter of Example 1, wherein generating the first printer transfer function further comprises equating reference ink usage volumes corresponding to the reference printer transfer function with first ink usage volumes corresponding to the first print measurement data.

Example 3 includes the subject matter of Examples 1 and 2, wherein equating reference ink usage volumes with first ink usage volumes comprises determining first ink drop sizes corresponding to the first print measurement data.

Example 4 includes the subject matter of Examples 1-3, wherein determining first ink drop sizes corresponding to the first print measurement data comprises determining reference ink drop usage fraction data corresponding to the reference printer transfer function; wherein ink drop usage fraction data represents the number of drops for a specific instructed drop size at a given DC level divided by the total number of drops possible for a halftone design.

Example 5 includes the subject matter of Examples 1-4, wherein the calibration logic further to receive an updated first print measurement data corresponding to the reference halftone design, the reference printer transfer function and a first print substrate and generate an updated intermediate printer transfer function, an updated first printer transfer function, and an updated first print substrate transfer function.

Example 6 includes the subject matter of Examples 1-5, wherein generating the updated first printer transfer function and generating an updated first print substrate transfer function comprises the first print substrate transfer function and the reference printer transfer function as baseline references.

Example 7 includes the subject matter of Examples 1-6, further comprising initiation of generating a second printer transfer function and a second substrate transfer function in response to identifying a second substrate different than the first substrate.

Example 8 includes the subject matter of Examples 1-7, wherein generating the second printer transfer function is based on received second print measurement data. wherein received second measurement data corresponds to the reference halftone design, the reference printer transfer function and a second print substrate.

Example 9 includes the subject matter of Examples 1-8, further comprising generating a composite transfer function based on a mathematical composition of the first print substrate transfer function and the first printer transfer function.

Example 10 includes the subject matter of Examples 1-9, further comprising one or more print engines.

Some embodiments pertain to Example 11 that includes at least one computer readable medium having instructions stored thereon, which when executed by one or more processors, cause the processors to receive a reference halftone design, receive reference ink drop size data, receive a reference printer transfer function corresponding to the reference halftone design, a reference printer response target and a reference print substrate, receive first print measurement data corresponding to the reference halftone design, the reference printer transfer function and a first print substrate, receive first printer response target, generate a first intermediate print substrate transfer function based on the first print measurement data and the first printer response target, generate a first printer transfer function based on the first intermediate print substrate transfer function, the reference halftone design, the reference ink drop size data and the reference printer transfer function and generate a first print substrate transfer function as an approximation of a function with input values determined as the first printer transfer function evaluated at digital count values and output values determined as the composition of the first intermediate print substrate transfer function and the reference printer transfer function evaluated at the digital count values, wherein a transfer function comprises a mapping of an input digital count to an output digital count.

Example 12 includes the subject matter of Example 11, wherein generating the first printer transfer function further comprises equating reference ink usage volumes corresponding to the reference printer transfer function with first ink usage volumes corresponding to the first print measurement data.

Example 13 includes the subject matter of Examples 11 and 12, wherein equating reference ink usage volumes with first ink usage volumes comprises determining first ink drop sizes corresponding to the first print measurement data.

Example 14 includes the subject matter of Examples 11-13, wherein determining first ink drop sizes corresponding to the first print measurement data comprises determining reference ink drop usage fraction data corresponding to the reference printer transfer function; wherein ink drop usage fraction data represents the number of drops for a specific instructed drop size at a given DC level divided by the total number of drops possible for a halftone design.

Example 15 includes the subject matter of Examples 11-14, having instructions stored thereon, which when executed by one or more processors, further cause the processors to receive an updated first print measurement data corresponding to the reference halftone design, the reference printer transfer function and a first print substrate and generate an updated intermediate printer transfer function, an updated first printer transfer function, and an updated first print substrate transfer function.

Some embodiments pertain to Example 16 that includes a method comprising receiving a reference halftone design, receiving reference ink drop size data, receiving a reference printer transfer function corresponding to the reference halftone design, a reference printer response target and a reference print substrate, receiving first print measurement data corresponding to the reference halftone design, the reference printer transfer function and a first print substrate, receiving first printer response target, generating a first intermediate print substrate transfer function based on the first print measurement data and the first printer response target, generating a first printer transfer function based on the first intermediate print substrate transfer function, the reference halftone design, the reference ink drop size data and the reference printer transfer function, and generating a first print substrate transfer function as an approximation of a function with input values determined as the first printer transfer function evaluated at digital count values and output values determined as the composition of the first intermediate print substrate transfer function and the reference printer transfer function evaluated at the digital count values, wherein a transfer function comprises a mapping of an input digital count to an output digital count.

Example 17 includes the subject matter of Example 16, wherein generating the first printer transfer function further comprises equating reference ink usage volumes corresponding to the reference printer transfer function with first ink usage volumes corresponding to the first print measurement data.

Example 18 includes the subject matter of Examples 16 and 17, wherein equating reference ink usage volumes with first ink usage volumes comprises determining first ink drop sizes corresponding to the first print measurement data.

Example 19 includes the subject matter of Examples 16-18, wherein determining first ink drop sizes corresponding to the first print measurement data comprises determining reference ink drop usage fraction data corresponding to the reference printer transfer function; wherein ink drop usage fraction data represents the number of drops for a specific instructed drop size at a given DC level divided by the total number of drops possible for a halftone design.

Example 20 includes the subject matter of Examples 16-19, further comprising receiving an updated first print measurement data corresponding to the reference halftone design, the reference printer transfer function and a first print substrate and generating an updated intermediate printer transfer function, an updated first printer transfer function, and an updated first print substrate transfer function.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
    at least one physical memory device to store calibration logic; and
    one or more processors coupled with the at least one physical memory device to execute the calibration logic to:
        receive a reference halftone design;
        receive reference ink drop size data;
        receive a reference printer transfer function corresponding to the reference halftone design, a reference printer response target and a reference print substrate;
        receive first print measurement data corresponding to the reference halftone design, the reference printer transfer function and a first print substrate;
        receive first printer response target;
        generate a first intermediate print substrate transfer function based on the first print measurement data and the first printer response target;
        generate a first printer transfer function based on the first intermediate print substrate transfer function, the reference halftone design, the reference ink drop size data and the reference printer transfer function; and
        generate a first print substrate transfer function as an approximation of a function with input values determined as the first printer transfer function evaluated at digital count values and output values determined as a composition of the first intermediate print substrate transfer function and the reference printer transfer function evaluated at the digital count values;
        wherein a transfer function comprises a mapping of an input digital count to an output digital count.

2. The system of claim 1, wherein generating the first printer transfer function further comprises equating reference ink usage volumes corresponding to the reference printer transfer function with first ink usage volumes corresponding to the first print measurement data.

3. The system of claim 2, wherein equating the reference ink usage volumes with the first ink usage volumes comprises determining first ink drop sizes corresponding to the first print measurement data.

4. The system of claim 3, wherein determining first ink drop sizes corresponding to the first print measurement data comprises determining reference ink drop usage fraction data corresponding to the reference printer transfer function; wherein ink drop usage fraction data represents a number of drops for a specific instructed drop size at a given DC level divided by a total number of drops possible for a halftone design.

5. The system of claim 1, wherein the calibration logic further to receive an updated first print measurement data corresponding to the reference halftone design, the reference printer transfer function and the first print substrate and generate an updated intermediate printer transfer function, an updated first printer transfer function, and an updated first print substrate transfer function.

6. The system of claim 5, wherein generating the updated first printer transfer function and generating the updated first print substrate transfer function comprises the first print substrate transfer function and the reference printer transfer function as baseline references.

7. The system of claim 1, further comprising initiation of generating a second printer transfer function and a second substrate transfer function in response to identifying a second substrate different than the first substrate.

8. The system of claim 7, wherein generating the second printer transfer function is based on received second print measurement data; wherein received second measurement data corresponds to the reference halftone design, the reference printer transfer function and a second print substrate.

9. The system of claim 1, further comprising generating a composite transfer function based on a mathematical composition of the first print substrate transfer function and the first printer transfer function.

10. The system of claim 1, further comprising one or more print engines.

11. At least one non-transitory computer readable medium having instructions stored thereon, which when executed by one or more processors, cause the processors to:
receive a reference halftone design;
receive reference ink drop size data;
receive a reference printer transfer function corresponding to the reference halftone design, a reference printer response target and a reference print substrate;
receive first print measurement data corresponding to the reference halftone design, the reference printer transfer function and a first print substrate;
receive first printer response target;
generate a first intermediate print substrate transfer function based on the first print measurement data and the first printer response target;
generate a first printer transfer function based on the first intermediate print substrate transfer function, the reference halftone design, the reference ink drop size data and the reference printer transfer function; and
generate a first print substrate transfer function as an approximation of a function with input values determined as the first printer transfer function evaluated at digital count values and output values determined as a composition of the first intermediate print substrate transfer function and the reference printer transfer function evaluated at the digital count values;
wherein a transfer function comprises a mapping of an input digital count to an output digital count.

12. The computer readable medium of claim 11, wherein generating the first printer transfer function further comprises equating reference ink usage volumes corresponding to the reference printer transfer function with first ink usage volumes corresponding to the first print measurement data.

13. The computer readable medium of claim 12, wherein equating reference the ink usage volumes with the first ink usage volumes comprises determining first ink drop sizes corresponding to the first print measurement data.

14. The computer readable medium of claim 13, wherein determining first ink drop sizes corresponding to the first print measurement data comprises determining reference ink drop usage fraction data corresponding to the reference printer transfer function; wherein ink drop usage fraction data represents a number of drops for a specific instructed drop size at a given DC level divided by a total number of drops possible for a halftone design.

15. The computer readable medium of claim 11, having instructions stored thereon, which when executed by one or more processors, further cause the processors to:
receive an updated first print measurement data corresponding to the reference halftone design, the reference printer transfer function and the first print substrate; and
generate an updated intermediate printer transfer function, an updated first printer transfer function, and an updated first print substrate transfer function.

16. A method comprising:
receiving a reference halftone design;
receiving reference ink drop size data;
receiving a reference printer transfer function corresponding to the reference halftone design, a reference printer response target and a reference print substrate;
receiving first print measurement data corresponding to the reference halftone design, the reference printer transfer function and a first print substrate;
receiving first printer response target;
generating a first intermediate print substrate transfer function based on the first print measurement data and the first printer response target;
generating a first printer transfer function based on the first intermediate print substrate transfer function, the reference halftone design, the reference ink drop size data and the reference printer transfer function; and
generating a first print substrate transfer function as an approximation of a function with input values determined as the first printer transfer function evaluated at digital count values and output values determined as a composition of the first intermediate print substrate transfer function and the reference printer transfer function evaluated at the digital count values;
wherein a transfer function comprises a mapping of an input digital count to an output digital count.

17. The method of claim 16, wherein generating the first printer transfer function further comprises equating reference ink usage volumes corresponding to the reference printer transfer function with first ink usage volumes corresponding to the first print measurement data.

18. The method of claim 17, wherein equating the reference ink usage volumes with the first ink usage volumes comprises determining first ink drop sizes corresponding to the first print measurement data.

19. The method of claim 18, wherein determining the first ink drop sizes corresponding to the first print measurement data comprises determining reference ink drop usage fraction data corresponding to the reference printer transfer function; wherein ink drop usage fraction data represents a number of drops for a specific instructed drop size at a given DC level divided by a total number of drops possible for a halftone design.

20. The method of claim 16, further comprising:
receiving an updated first print measurement data corresponding to the reference halftone design, the reference printer transfer function and the first print substrate; and
generating an updated intermediate printer transfer function, an updated first printer transfer function, and an updated first print substrate transfer function.

\* \* \* \* \*